(12) United States Patent
Nishida

(10) Patent No.: US 6,493,138 B2
(45) Date of Patent: Dec. 10, 2002

(54) MICROSCOPIC OPTICAL SYSTEM

(75) Inventor: Hiroyuki Nishida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/793,891

(22) Filed: Feb. 28, 2001

(65) Prior Publication Data

US 2001/0026397 A1 Oct. 4, 2001

(30) Foreign Application Priority Data

Mar. 10, 2000 (JP) ........................................ 2000-066170

(51) Int. Cl.$^7$ ........................... G03B 13/06; G02B 5/08; F21V 9/06
(52) U.S. Cl. ....................... 359/434; 356/350; 356/361; 356/368
(58) Field of Search ........................ 359/350, 354–357, 359/362, 368, 434–435, 656–661, 442, 432, 676–677, 691

(56) References Cited

U.S. PATENT DOCUMENTS

| | | | | |
|---|---|---|---|---|
| 4,779,966 A | * | 10/1988 | Friedman | ..................... 359/359 |
| 5,260,578 A | * | 11/1993 | Bliton et al. | .............. 250/461.1 |
| 5,486,694 A | * | 1/1996 | Harris | |
| 5,682,567 A | * | 10/1997 | Spruck et al. | |
| 5,999,310 A | * | 12/1999 | Shafer et al. | ................ 359/351 |
| 6,157,484 A | * | 12/2000 | Nishida | ....................... 359/434 |
| 6,219,189 B1 | * | 4/2001 | Tomimatsu et al. | ......... 359/659 |

FOREIGN PATENT DOCUMENTS

| | | | |
|---|---|---|---|
| JP | 61-132901 | * | 6/1986 |
| JP | 8-179200 | | 7/1996 |
| JP | 10-260349 | | 9/1998 |

\* cited by examiner

*Primary Examiner*—Thong Nguyen
(74) *Attorney, Agent, or Firm*—Pillsbury Winthrop LLP

(57) ABSTRACT

A microscopic optical system which is used in an ultraviolet range of short wavelengths and has good off-axis performance, such as chromatic aberration of magnification. The optical system has an objective optical system for forming an intermediate image of a specimen and a relay optical system for imaging the intermediate image again. The relay optical system has a first lens group and a second lens group, and at least one convex lens of at lease one of the first and second lens groups is formed from quartz.

16 Claims, 10 Drawing Sheets

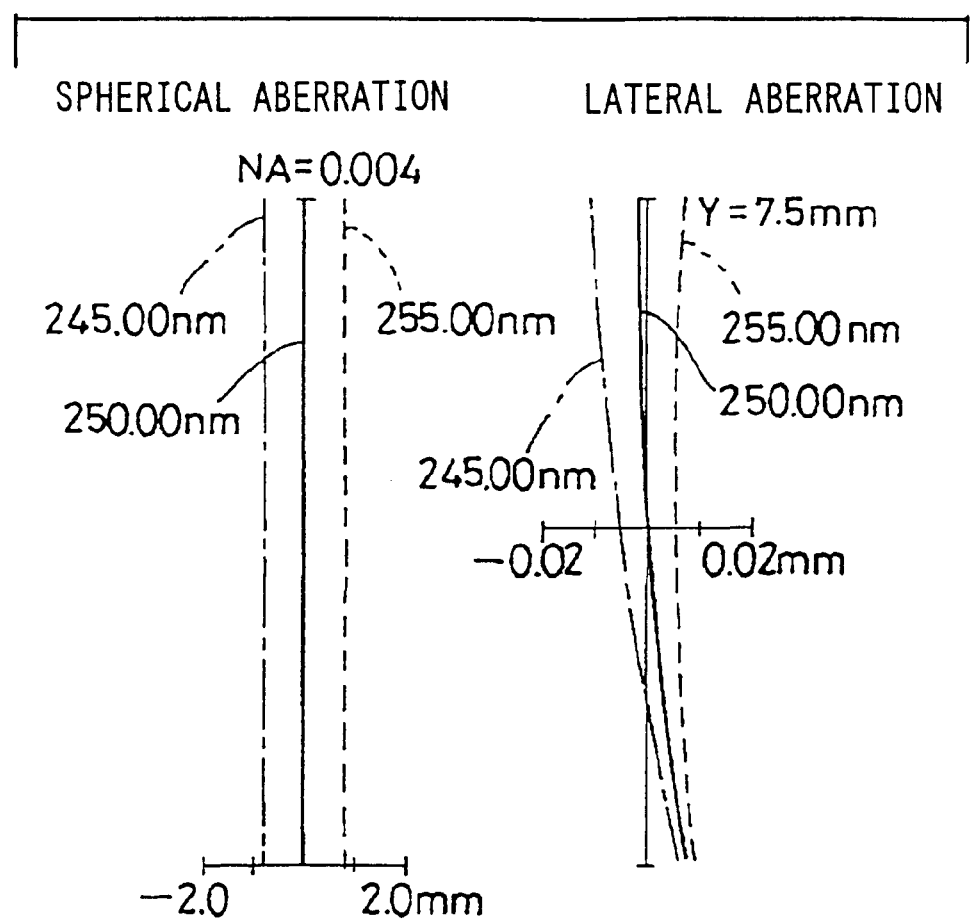

MICROSCOPIC OPTICAL SYSTEM

CROSS-REFERENCE TO RELATED APPLICATIONS

This application is based on and claims priority of Japanese Patent Application No. 2000-66170 filed on Mar. 10, 2000, the content of which is incorporated herein by reference.

BACKGROUND OF THE INVENTION

1. Field of the Invention

This invention relates to a microscopic optical system for forming an intermediate image of a specimen by an objective lens and imaging the intermediate image again by a relay optical system, and more particularly to a microscopic optical system which has good off-axis performance, such as chromatic aberration of magnification, when using light in an ultraviolet range, especially of short wavelengths, and which is suitable for image pickup by a CCD (charge-coupled device) camera or the like.

2. Description of Related Art

Recently, in the semiconductor market, as IC patterns are refined, microscopes for observing them are increasingly required to have high resolution. One of the techniques to realize a microscope of high resolution is to shorten the wavelength of its light source. The wavelength is inversely proportional to the resolution. If the wavelength becomes half, the resolution doubles.

Accordingly, the development of microscopes using ultraviolet rays is expected.

Examples of lenses for ultraviolet rays used in optical systems for ultraviolet rays are described in Japanese Laid-Open Patent Publications Nos. Hei 8-179200 and Hei 10-260349.

Japanese Laid-Open Patent Publication No. Hei 8-179200 describes a collimating lens for ultraviolet rays which uses only quartz as its glass material.

Japanese Laid-Open Patent Publication No. Hei 10-260349 describes an imaging optical system for an ultraviolet laser beam which uses quartz and fluorite as its glass materials.

In constructing an ultraviolet microscope, if a laser light source is used as its ultraviolet light source, the light quantity of the light source is sufficient, but its lifetime is short and it is expensive. Accordingly, its running costs are high, which is a problem.

On the other hand, if an arc light source, such as a mercury lamp, is used, its running costs can be kept low. However, if it is used with a single wavelength, no infficient luminance can be obtained so that only dark observation can be made. If it is used with a wide range of wavelengths, bright observation is possible. In this case, however, if chromatic aberration of the optical system, such as on-axis chromatic aberration and chromatic aberration of magnification, is not corrected, its imaging performance deteriorates so that no sufficiently high resolution can be obtained. That is, if the on-axis chromatic aberration of the optical system is not corrected, the focal position differs for each wavelength. Thus, when observation is made with a CCD camera or the like (since the ultraviolet rays cannot be observed with the naked eye), in-focus and out-of-focus images are mixedly picked up so that the resultant image of poor imaging quality only can be observed. Further, if its chromatic aberration of magnification is not corrected although the on-axis chromatic aberration of the optical system is corrected, images of respective wavelengths are in focus, but the magnifications of the images of respective wavelengths are different. Accordingly, on the peripheries of the respective images, their imaging positions are different so that the images appear to be displaced laterally. Thus, the respective images displaced laterally are superposedly picked up by the CCD camera and cannot be distinguished from each other so that the resultant image appears as if a point image were expanded. Consequently, on its periphery, the resultant image of poor image quality only can be observed.

Moreover, in view of the use of the CCD camera, the angle of off-axis rays also needs to be considered. When the CCD camera is used for image pickup, it is the most preferable that light is incident on the light receiving surface of the CCD perpendicularly (at 90°). If the angle of light incident on the light receiving surface differs largely from 90°, the quantity of light is lost due to the sensitivity characteristic of the image pickup device (CCD) with respect to the angle of light incident on its light receiving surface (shading phenomenon) so that the periphery of the image is darker than its center. Accordingly, the angle of off-axis rays (position of the exit pupil) must be considered at the time of lens design.

Since the optical system described in Japanese Laid-Open Patent Publication No. Hei 8-179200 comprises a refractive lens whose glass material is quartz only, chromatic aberration cannot be corrected. Thus, even if this conventional optical system is simply developed, it is impossible to attain a microscopic optical system for a range of ultraviolet wavelengths which has good imaging performance. Further, in this conventional optical system, the image flatness is considered, but the position of the exit pupil is not referred to. Accordingly, even if this conventional art is simply developed to construct a relay optical system, it cannot cope with the shading phenomenon of the CCD camera.

The conventional art described in Japanese Laid-Open Patent Publication No. Hei 10-260349 uses fluorite for a convex lens and quartz for a concave lens and is developed as an optical system for an ArF excimer laser.

Since the ArF excimer laser has several oscillation lines within a wavelength range of about 1 nm according to its construction, it is preferable that chromatic aberrations are corrected within this wavelength range. Thus, in order to correct on-axis chromatic aberration, fluorite is used for the convex lens and quartz for the concave lens. However, even if this technique is straightforwardly developed, it is impossible to reach a microscopic optical system in which chromatic aberration of magnification is also considered.

Moreover, this conventional art does not refer to the position of the exit pupil and the like. Even if this art is developed, one cannot obtain a relay optical system which can eliminate the shading phenomenon at the time of image pickup by the CCD camera.

BRIEF SUMMARY OF THE INVENTION

An object of the present invention is to provide a microscopic optical system for forming an intermediate image of a specimen by an objective optical system and imaging the intermediate image again by a relay optical system, the microscopic optical system using light in an ultraviolet range, especially of short wavelengths, and having good off-axis performance, such as chromatic aberration of magnification.

A microscopic optical system according to the present invention comprises an objective optical system for forming an intermediate image of a specimen and a relay optical system for relaying the intermediate image, wherein the relay optical system comprises at lease one quartz lens having positive refractive power.

BRIEF DESCRIPTION OF THE DRAWINGS

FIG. 11 shows aberration curves of example 5.

DETAILED DESCRIPTION OF THE INVENTION

Figure 1:
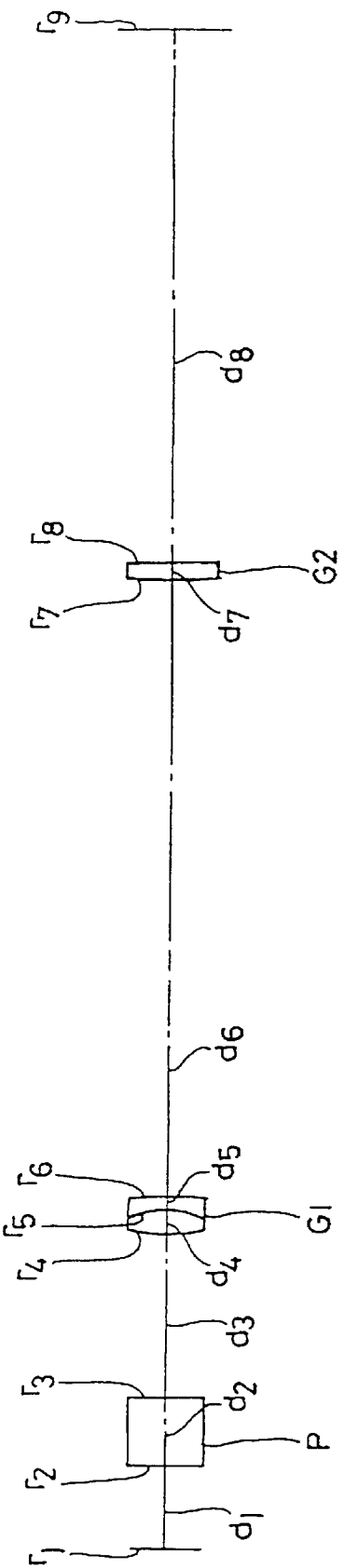
FIG. 1 shows the structure of example 1 of the present invention.

A microscopic optical system according to the present invention comprises an objective optical system for forming an intermediate image of a specimen and a relay optical system for imaging the intermediate image again. The relay optical system comprises a first lens group and a second lens group, and at least one convex lens of at lease one of the first and second lens groups is formed from quartz.

In an ordinary microscope, rays exiting from the objective optical system are usually substantially telecentric. At the intermediate image position the off-axis principal ray is substantially parallel to the optical axis, and the exit pupil is positioned substantially at infinity.

When the relay optical system consists of one lens group, the pupil is positioned at a finite position near the rear focal position of the lens group. When the pupil is at a finite position, the off-axis principal ray is not parallel to the optical axis. Thus, if an image is picked up in this state, the light is incident on the image pickup device of the CCD camera at an angle which differs from 90°, so that the shading phenomenon arises.

In the present invention, in order to solve the above problem, the relay optical system is formed by two lens groups: the first and second lens groups.

If the relay optical system is a magnifying system, in general, the focal length of the first lens group on the side of the objective optical system is shorter than that of the second lens group. In the lens group having a shorter focal length, each surface has a smaller radius of curvature, that is, a larger curvature, so that the performance of this lens group (the first lens group) controls the performance of the relay optical system. Accordingly, the second lens group functions as a field lens and mainly has a function of controlling the exit pupil of the relay optical system. It is preferable that the field lens does not have much influence on the aberrations, including chromatic aberration, of the optical system. Thus, glass of a high refractive index and a low dispersion is preferably used. If the lens has a high refractive index, the radius of curvature can be large so that the influence on spherical aberration, coma and the like is not large. If it has a low dispersion, it does not have much influence on chromatic aberrations. Accordingly, in the case of an optical system for a visible light range, a glass material of a high refractive index and a low dispersion is often used.

However, in the case of an optical system for ultraviolet wavelengths, especially not longer than 300 nm, there is no glass material which transmits light in this wavelength range and has a high refractive index and a low dispersion. Therefore, one cannot help but use fluorite, which has a high transmissivity in the above wavelength range, a low refractive index, and a low dispersion, or quartz, which has a high transmissivity in the above wavelength range, a somewhat high refractive index and a high dispersion. In this case, in view of chromatic aberration of magnification, quartz has been found to be preferable.

If the fluorite of a low refractive index is used, the radius of curvature becomes small and the resultant aberrations should be corrected by the first lens group. Instead, when constructing the relay optical system by considering also chromatic aberration of magnification, it is advantageous that the quartz of a high refractive index is used to increase the radius of curvature so as to reduce the aberrations and that the chromatic aberration resulting from a high dispersion are corrected by the first lens group.

On the other hand, if the relay optical system is a reducing system, the first lens group functions as a field lens and quartz is used for at least one convex lens of the first lens group.

Further, in the microscopic optical system of the present invention, a part of the relay optical system may be inserted into and removed from the optical path, or changed over, or displaced in the direction of the optical axis to vary its relay magnification.

Next, in the microscopic optical system of the present invention, it is preferable that the second lens group of the relay optical system comprises subgroup 2A and subgroup 2B and that one of the following relations (1) and (2) is satisfied:

(1) if $f_2 > f_{2B}$, quartz is used for at least one convex lens of subgroup 2A and fluorite is used for at least one concave lens of subgroup 2A; and (2) if $f_2 < f_{2B}$, fluorite is used for at least one convex lens of subgroup 2A and quartz is used for at least one concave lens of subgroup 2A, where $f_2$ is the focal length of the second lens group and $f_{2B}$ is the focal length of subgroup 2B.

In lens designing including correction of chromatic aberration, it is generally preferable that glass of a low refractive index and a low dispersion is used for a convex lens and that glass of a high refractive index and a high dispersion is used for a concave lens. Accordingly, in the optical system for an ultraviolet range, it is preferable to use fluorite for a convex lens and quartz for a concave lens. This is described also in Japanese Laid-Open Patent Publication No. Hei 10-260349.

However, if $f_2 > f_{2B}$, the focal length of the second lens group is longer compared with the case of the second lens group consisting of subgroup 2B only, and the magnification of the whole relay optical system is larger, so that the influence of the chromatic aberration, especially chromatic aberration of magnification, occurring in the second lens group is relatively small. Accordingly, in order to improve the performance of the whole relay optical system, quartz is used for a convex lens to increase the radius of curvature of its surface (decrease the curvature of the surface), thereby reducing the occurrence of the aberrations, and fluorite is used for a concave lens to decrease the radius of curvature of its surface (increase the curvature of the surface), thereby strengthen the correction of the aberrations by the concave surface.

Reversely, if $f_2 < f_{2B}$, the focal length of the second lens group is shorter compared with the case of the second lens group consisting of subgroup 2B only, so that the aberrations, such as chromatic aberration, occurring in the second lens group cannot be neglected with respect to the aberrations occurring in the first lens group. Thus, fluorite is used for a convex lens and quartz is used for a concave lens to reduce the occurrence of chromatic aberration, especially on-axis chromatic aberration, so that the optical performance of the whole relay optical system can be improved.

For the above reasons, in a preferred embodiment of the present invention as stated above, the second lens group of the relay optical system comprises subgroups 2A and 2B, and subgroup 2B is inserted into and removed from the optical path or changed over to change the relay magnification. Thus, by inserting into and removing from the optical path or changing over of subgroup 2B, the observing magnification of the microscopic optical system can be changed without changing the objective optical system.

Now, examples 1–5 of the present invention are described.

EXAMPLE 1

| | | |
|---|---|---|
| $r_1$ (intermediate image) = ∞ | $d_1$ = 12.000 | |
| $r_2$ = ∞ | $d_2$ = 10.000 | quartz |
| $r_3$ = ∞ | $d_3$ = 23.893 | |
| $r_4$ = 21.918 | $d_4$ = 3.500 | fluorite |
| $r_5$ = −10.976 | $d_5$ = 2.000 | quartz |
| $r_6$ = −56.699 | $d_6$ = 90.014 | |
| $r_7$ = 76.413 | $d_7$ = 2.500 | quartz |
| $r_8$ = −259.367 | $d_8$ = 75.713 | |
| $r_9$ (final image) = ∞ | | |

EXAMPLE 2

| | | |
|---|---|---|
| $r_1$ (intermediate image) = ∞ | $d_1$ = 12.000 | |
| $r_2$ = ∞ | $d_2$ = 10.000 | quartz |
| $r_3$ = ∞ | $d_3$ = 57.000 | |
| $r_4$ = 50.637 | $d_4$ = 2.500 | quartz |
| $r_5$ = −54.451 | $d_5$ = 42.000 | |
| $r_6$ = −18.722 | $d_6$ = 2.000 | fluorite |
| $r_7$ = 17.896 | $d_7$ = 5.000 | |
| $r_8$ = 31.753 | $d_8$ = 2.970 | quartz |
| $r_9$ = −30.616 | $d_9$ = 37.031 | |
| $r_{10}$ = 59.816 | $d_{10}$ = 2.230 | quartz |
| $r_{11}$ = 10.770 | $d_{11}$ = 2.227 | |
| $r_{12}$ = 15.810 | $d_{12}$ = 3.460 | fluorite |
| $r_{13}$ = −15.149 | $d_{13}$ = 41.370 | |
| $r_{14}$ (final image) = ∞ | | |

EXAMPLE 3

| | | |
|---|---|---|
| $r_1$ (intermediate image) = ∞ | $d_1$ = 12.000 | |
| $r_2$ = ∞ | $d_2$ = 10.000 | quartz |
| $r_3$ = ∞ | $d_3$ = 23.893 | |
| $r_4$ = 21.918 | $d_4$ = 3.500 | fluorite |
| $r_5$ = −10.976 | $d_5$ = 2.000 | quartz |
| $r_6$ = −56.699 | $d_6$ = 31.912 | |
| $r_7$ = 15.106 | $d_7$ = 3.460 | quartz |
| $r_8$ = −15.106 | $d_8$ = 5.729 | |
| $r_9$ = −7.123 | $d_9$ = 2.000 | fluorite |
| $r_{10}$ = 7.123 | $d_{10}$ = 46.913 | |
| $r_{11}$ = 76.413 | $d_{11}$ = 2.500 | quartz |
| $r_{12}$ = −259.367 | $d_{12}$ = 75.713 | |
| $r_{13}$ (final image) = ∞ | | |
| $f_2$ = 839.7 mm, $f_{2B}$ = 116.6 mm | | |

EXAMPLE 4

| | | |
|---|---|---|
| $r_1$ (intermediate image) = ∞ | $d_1$ = 12.000 | |
| $r_2$ = ∞ | $d_2$ = 10.000 | quartz |
| $r_3$ = ∞ | $d_3$ = 23.893 | |
| $r_4$ = 21.918 | $d_4$ = 3.500 | fluorite |
| $r_5$ = −10.976 | $d_5$ = 2.000 | quartz |
| $r_6$ = −56.699 | $d_6$ = 105.550 to 63.823 to 9.756 | |
| $r_7$ = 24.371 | $d_7$ = 5.000 | fluorite |
| $r_8$ = −40.403 | $d_8$ = 12.010 to 9.888 to 9.265 | |
| $r_9$ = −16.818 | $d_9$ = 2.000 | fluorite |
| $r_{10}$ = 23.100 | $d_{10}$ = 10.973 to 49.470 to 125.494 | |
| $r_{11}$ = 76.413 | $d_{11}$ = 2.500 | quartz |
| $r_{12}$ = −259.367 | $d_{12}$ = 24.020 to 30.159 to 19.527 | |
| $r_{13}$ (final image) = ∞ | | |

EXAMPLE 5

| | | |
|---|---|---|
| $r_1$ (intermediate image) = ∞ | $d_1$ = 12.000 | |
| $r_2$ = ∞ | $d_2$ = 10.000 | quartz |
| $r_3$ = ∞ | $d_3$ = 23.893 | |
| $r_4$ = 21.918 | $d_4$ = 3.500 | fluorite |
| $r_5$ = −10.976 | $d_5$ = 2.000 | quartz |
| $r_6$ = −56.699 | $d_6$ = 32.540 | |
| $r_7$ = −67.023 | $d_7$ = 2.000 | quartz |
| $r_8$ = 29.189 | $d_8$ = 8.234 | |
| $r_9$ = 45.818 | $d_9$ = 2.970 | fluorite |
| $r_{10}$ = −40.446 | $d_{10}$ = 45.296 | |
| $r_{11}$ = 76.413 | $d_{11}$ = 2.500 | quartz |
| $r_{12}$ = −259.367 | $d_{12}$ = 75.711 | |
| $r_{13}$ (final image) = ∞ | | |
| $f_2$ = 85.8 mm, $f_{2B}$ = 116.6 mm | | |

In the above lists, $r_1, r_2, \ldots$ are the radii of curvature of respective lens surfaces, and $d_1, d_2, \ldots$ are the thicknesses of respective lenses or the air gaps between the lenses. The unit of $r_1, r_2, \ldots$ and $d_1, d_2, \ldots$ is mm.

Example 1 has a structure shown in FIG. 1. FIG. 1 and the above data show the structure of relay optical system from the intermediate image to the final image.

The relay optical system of example 1 comprises, in order from the intermediate image on the side of the object, a prism P, a first lens group G1 including a cemented lens composed of a convex lens and a concave lens, and a second lens group G2 including a convex lens. The convex lens of the second lens group G2 is formed from quartz.

Figure 7:
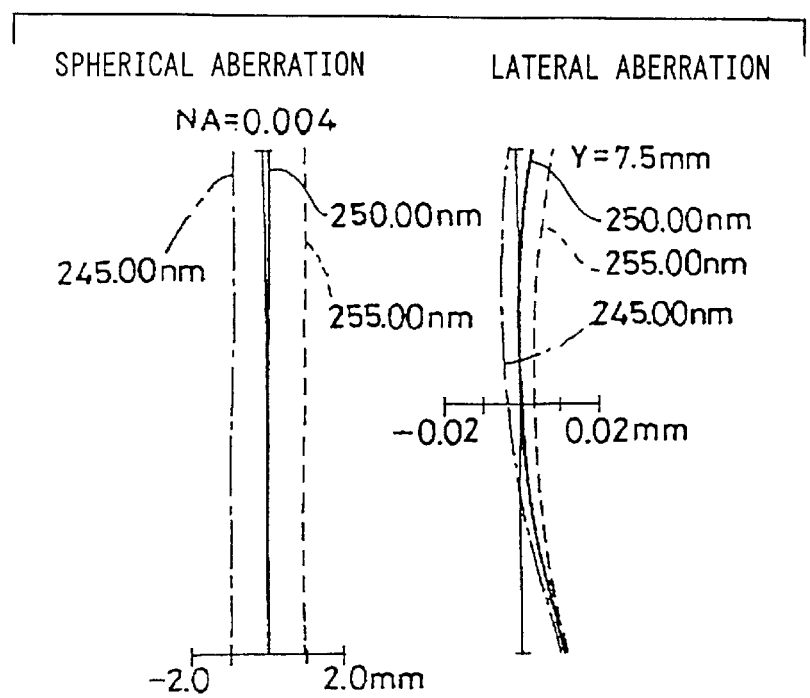
FIG. 7 shows aberration curves of example 1.

The magnification of this relay optical system is 2.5. The design wavelength of this example is 250±5 nm. FIG. 7 show aberration diagrams for wavelengths of 245, 250, and 255 nm, and Y is the image height in mm in the final image plane.

Figure 2:
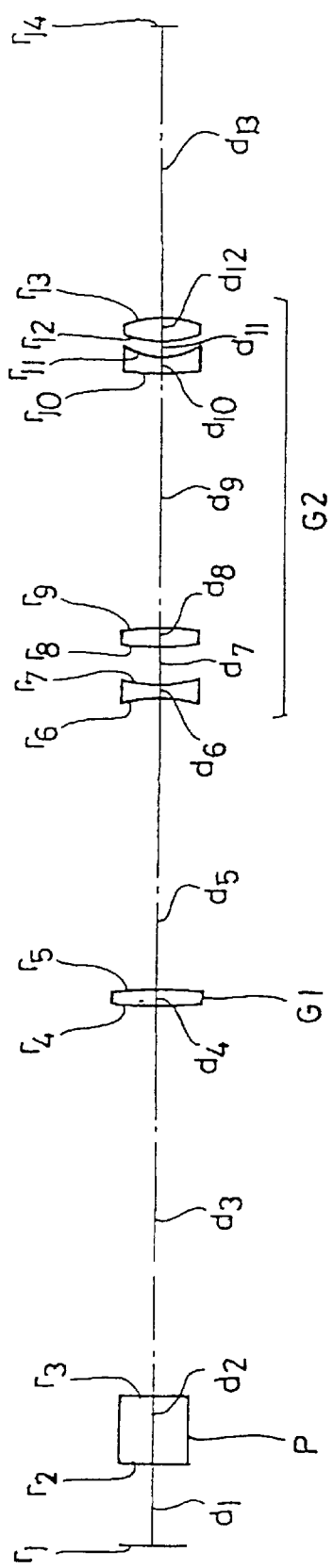
FIG. 2 shows the structure of example 2 of the present invention.

Example 2 is constructed as shown in FIG. 2. The relay optical system of example 2 comprises a prism P, a first lens group G1 including a convex lens, and a second lens group G2 including a concave lens, a convex lens, a concave lens, and a convex lens.

In example 2, the convex lens of the first lens group G1 and the object-side convex lens of the second lens group G2 are formed from quartz.

Figure 8:
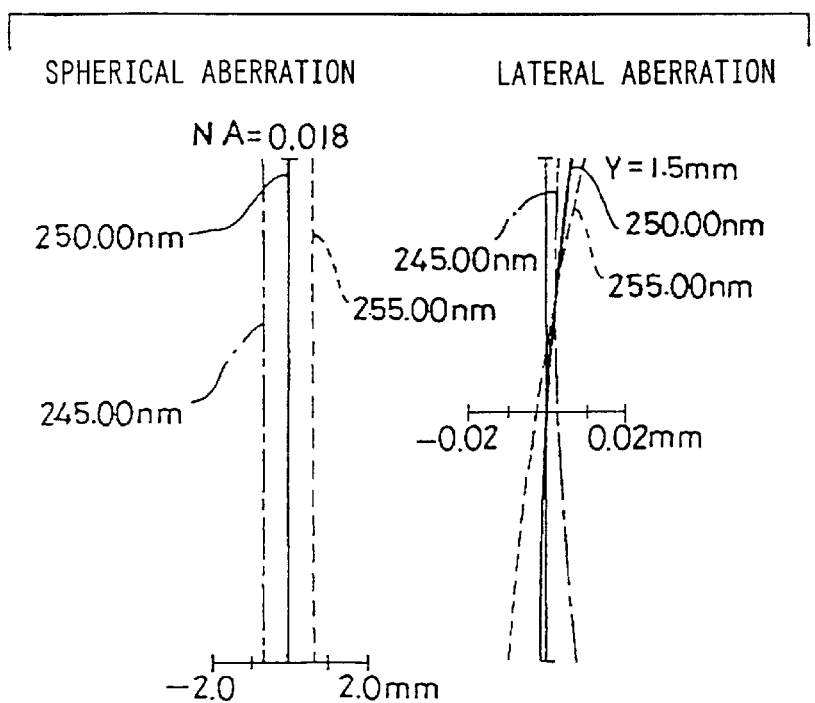
FIG. 8 shows aberration curves of example 2.

The magnification of the relay optical system of example 2 is 0.5. Aberrations of this relay optical system are shown in FIG. 8.

Figure 3:
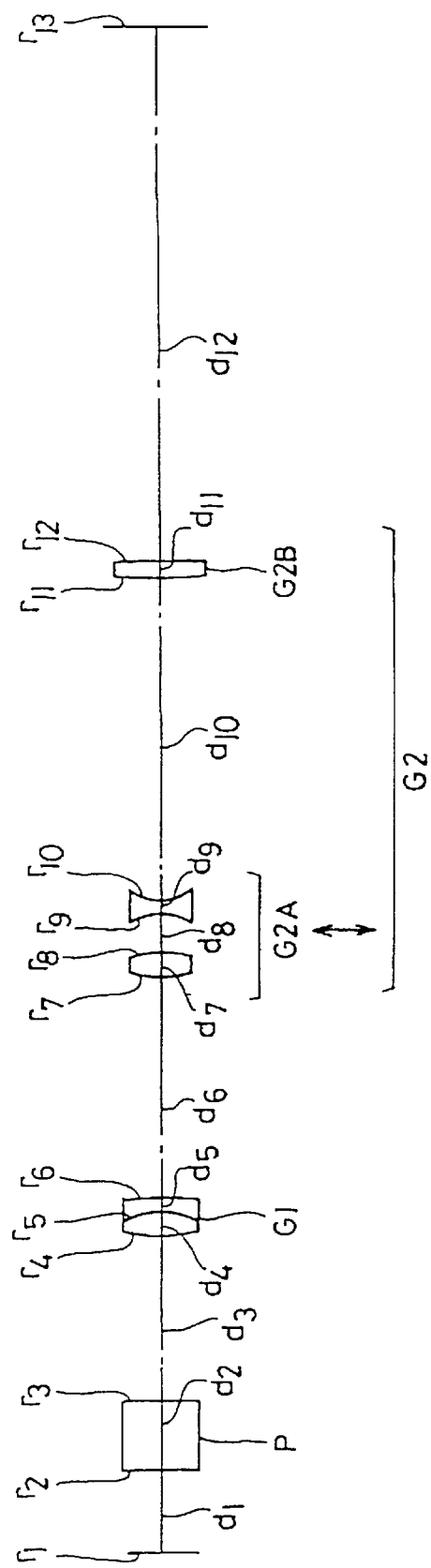
FIG. 3 shows the structure of example 3 of the present invention.

Example 3 is structured as shown in FIG. 3. The relay optical system of example 3 comprises a prism P, a first lens group G1 including a cemented lens composed of a convex lens and a concave lens, and a second lens group G2 comprising a subgroup G2A and a subgroup G2B, the subgroup G2A including a convex lens and a concave lens, and the subgroup G2B including a convex lens. The convex lenses of the subgroups G2A and G2B of the second lens group are formed from quartz, and the concave lens of the subgroup G2A is formed from fluorite.

The magnification of the relay optical system of example 3 is 5.

In this example, the subgroup G2A can be inserted into and removed from the optical path. When the subgroup G2A is removed from the optical path, the relay optical system has the same structure as in example 1. By this changeover, the magnification of the relay optical system is changed over from 5 to 2.5.

Figure 9:
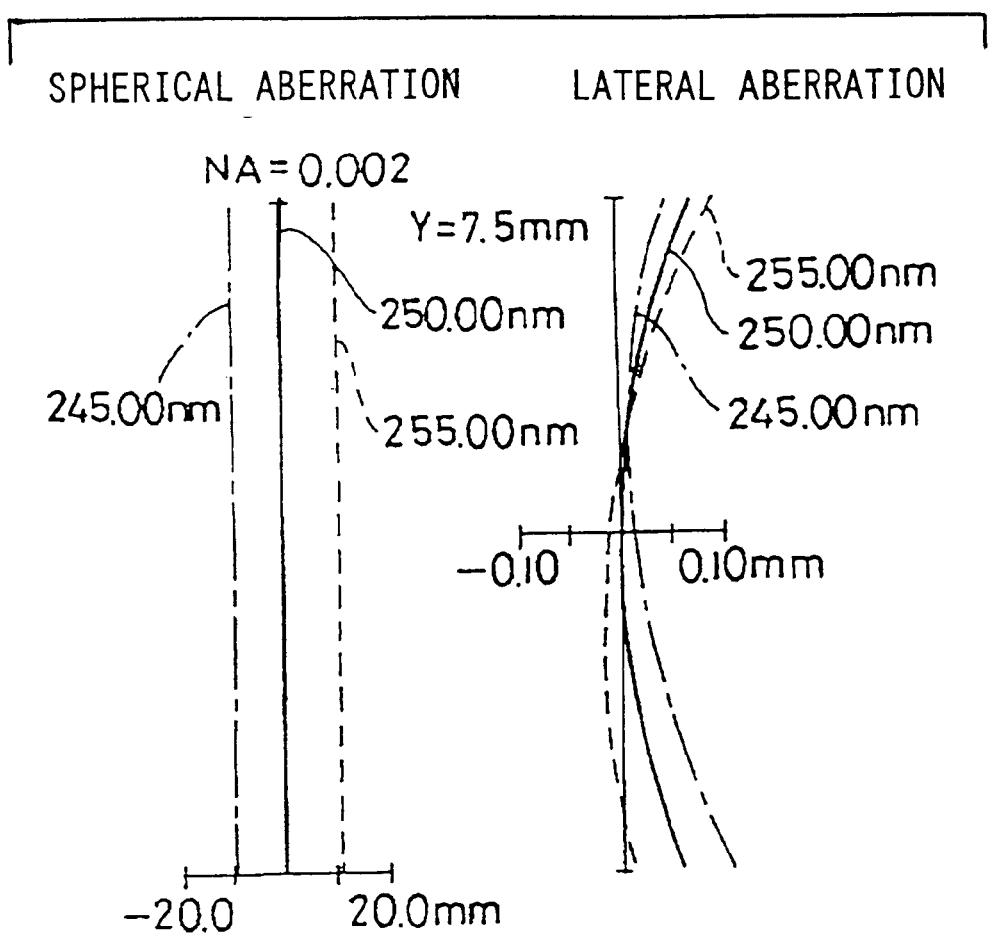
FIG. 9 shows aberration curves of example 3.

FIG. 9 shows aberrations of example 3 when the subgroup G2A shown in FIG. 3 is inserted into the optical path.

Figure 4:
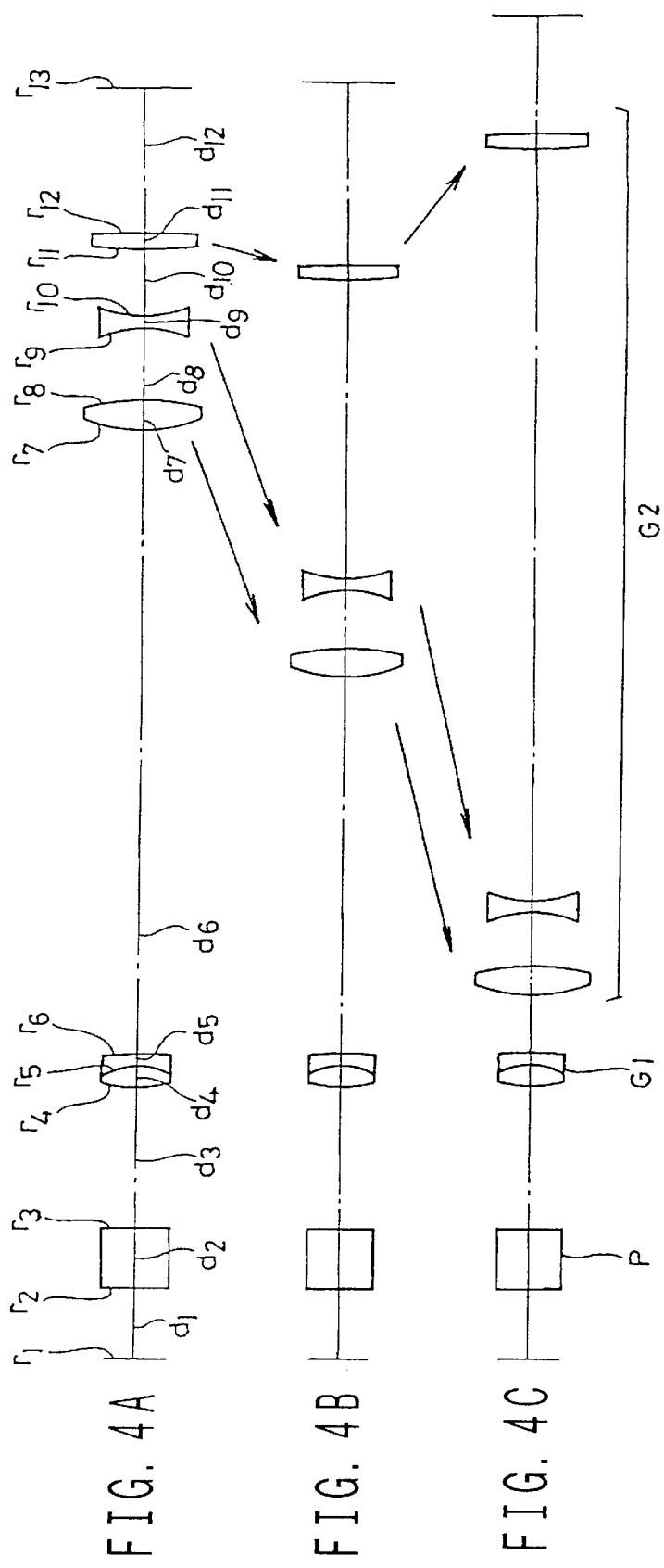
FIGS. 4A, 4B, and 4C show the structure of example 4 of the present invention.

Example 4 is constructed as shown in FIGS. 4A to 4C. The relay optical system of example 4 comprises a prism P, a first lens group G1 including a cemented lens composed of a convex lens and a concave lens, and a second lens group G2 including a convex lens, a concave lens, and a convex lens.

In this example 4, by moving the lenses of the second lens group G2 along the optical axis, the magnification of the relay optical system is varied. That is, in the state shown in FIG. 4A, the magnification of the relay optical system is 2.5. When the respective lenses of the second lens group G2 are moved as shown in FIG. 4B, the magnification is 3.5, and in the state of FIG. 4C, it is 5.

Figures 10A, 10B:
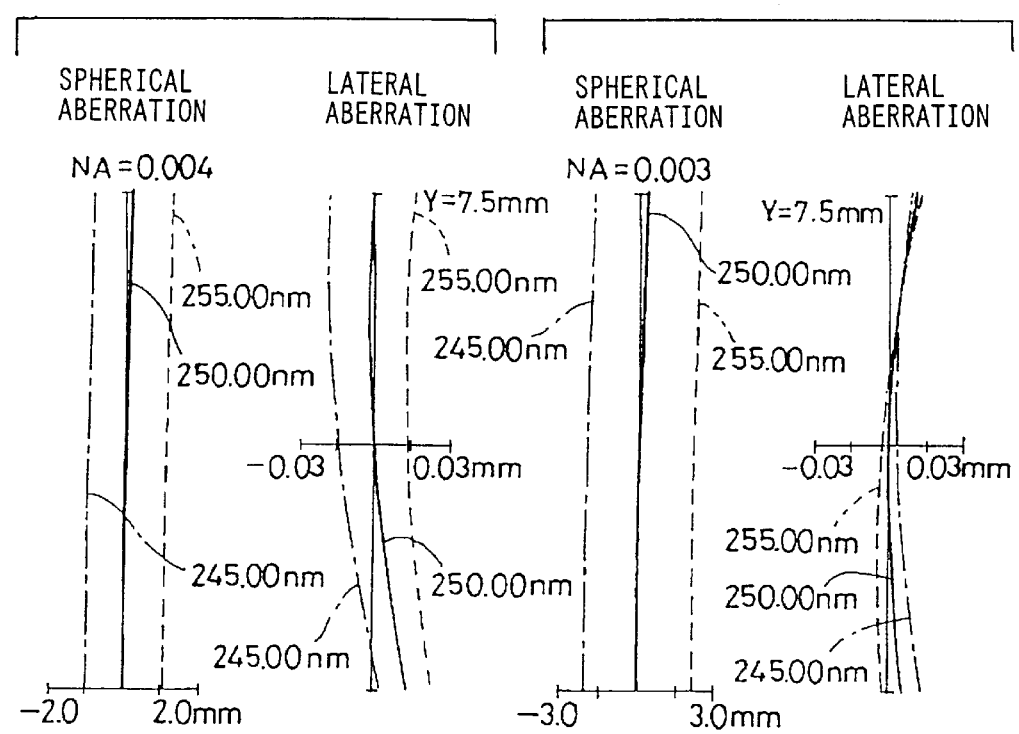
FIGS. 10A, 10B, and 10C show aberration curves of example 4.
Figure 10C:
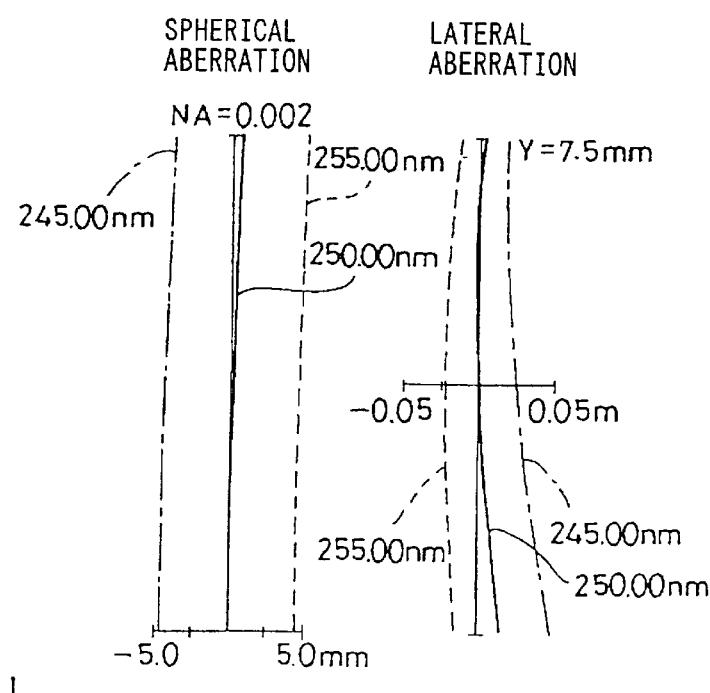

Aberrations of the relay optical system of example 4 in the states of FIGS. 4A, 4B, and 4C are shown in FIGS. 10A, 10B, and 10C, respectively.

Figure 5:
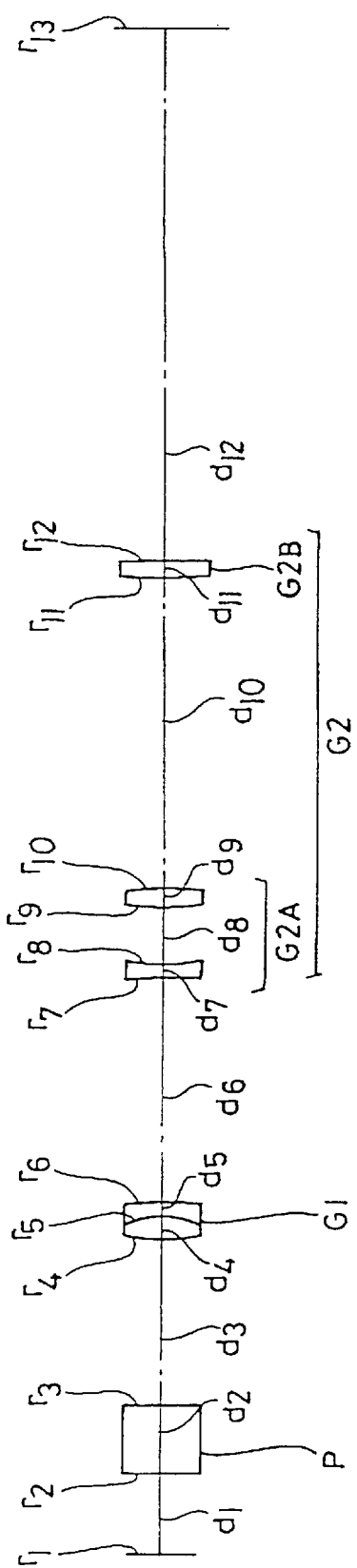
FIG. 5 shows the structure of example 5 of the present invention.

The relay optical system of example 5 of the present invention has a structure shown in FIG. 5 and comprises a prism P, a first lens group G1 including a cemented lens composed of a convex lens and a concave lens, and a second lens group G2 comprising a subgroup G2A and a subgroup G2B, the subgroup G2A including a concave lens and a convex lens, and the subgroup G2B including a convex lens. The concave lens and convex lens of the subgroups G2A of the second lens group are formed from quartz and fluorite, respectively, and the convex lens of the subgroup G2B of the second lens group is formed from quartz.

The magnification of the relay optical system of this example 5 is 2.

Aberrations of the relay optical system of example 5 are shown in FIG. 11.

Figure 6:
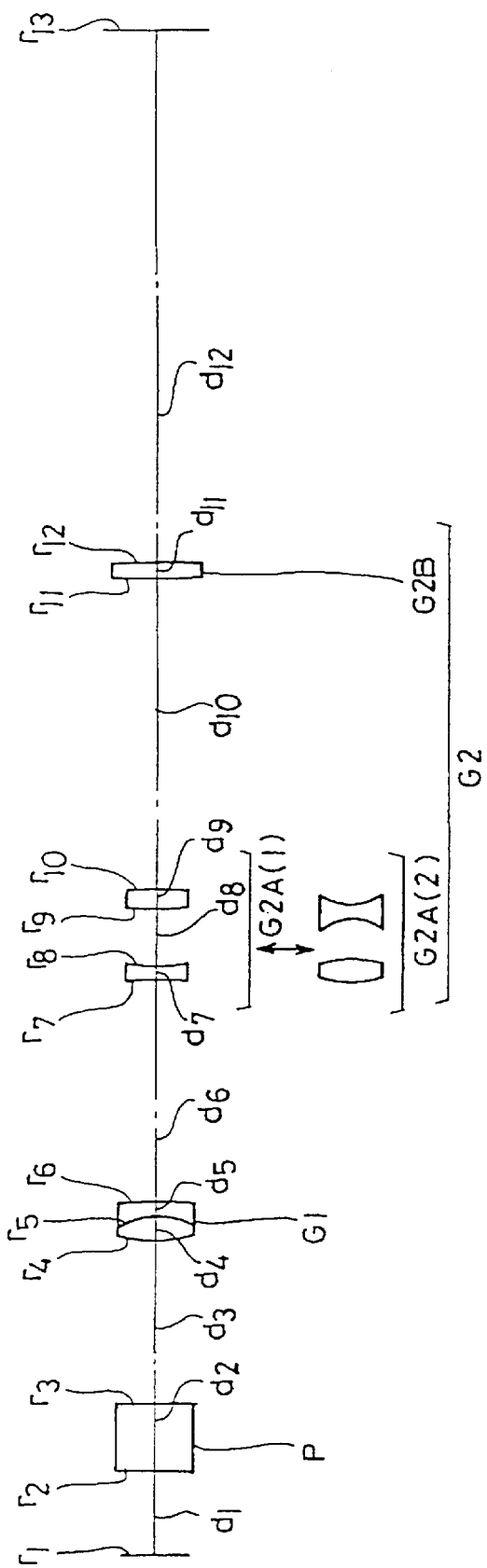
FIG. 6 shows the structure of example 6 of the present invention.

The relay optical system of example 6 of the present invention is shown in FIG. 6 and comprises a prism P, a first lens group G1 including a cemented lens composed of a convex lens and a concave lens, and a second lens group G2 comprising a subgroup G2A(1) and a subgroup G2B, the subgroup G2A(1) including a concave lens and a convex lens, and the subgroup G2B including a convex lens.

This example 6 has the same structure as that of example 5, and the subgroup G2A(1) can be changed for another subgroup G2A(2) including a convex lens and a concave lens. The subgroup G2A(1) has the same structure as that of the subgroup G2A of example 5, and the structure of the subgroup G2A(2) is the same as that of the subgroup G2A of example 3 shown in FIG. 3. By this changeover, the magnification of the relay optical system can be changed over from 2 to 5.

As described above, the microscopic optical system of the present invention comprises an objective optical system and a relay optical system, the relay optical system comprises two lens groups, and the glass material of at least one convex lens of the relay optical system is quartz. With this structure, the microscopic optical system has good off-axis performance, such as chromatic aberration of magnification, even when using light in an ultraviolet wavelength range, and is suitable also for image pickup by a CCD camera.

What is claimed is:

1. A microscope optical system, comprising:

an objective optical system for forming an intermediate image of an object which is irradiated by an ultra-violet illumination light; and a relay optical system having a plurality of lenses including a positive lens and a negative lens for relaying the intermediate image, a prism disposed between the intermediate image and the relay optical system, wherein the relay optical system comprises at least one quartz lens having positive refractive power.

2. The microscope optical system of claim 1, wherein the relay optical system comprises a first lens group and a second lens group, and wherein the quartz lens having positive refractive power is arranged in the first lens group.

3. The microscope optical system of claim 2, wherein the relay optical system is a reducing optical system.

4. The microscope optical system of claim 1, wherein the relay optical system comprises a first lens group and a second lens group, and wherein the quartz lens having positive refractive power is arranged in the second lens group.

5. The microscope optical system of claim 4, wherein the relay optical system is a magnifying optical system.

6. A microscope optical system, comprising:

an objective optical system for forming an intermediate image of an object; and a relay optical system having a plurality of lenses for relaying the intermediate image, wherein the relay optical system comprises at least one quartz lens having positive refractive power, wherein a lens disposed farthest from the intermediate image in the relay optical system is fixed on an optical axis, and wherein the microscope optical system further comprises a driving mechanism for inserting into and removing from an optical path a part of the lenses other than the fixed lens of the relay optical system.

7. The microscope optical system of claim 6, wherein the relay optical system comprises a first lens group and a second lens group, and wherein said part of the lenses are included in the second lens group.

8. A microscope optical system, comprising:
- an objective optical system for forming an intermediate image of an object; and
- a relay optical system having a plurality of lenses for relaying the intermediate image,
- wherein the relay optical system comprises at least one quartz lens having positive refractive power,
- wherein the relay optical system includes two movable lenses for changing magnification thereof, and
- wherein the microscope optical system further comprises a driving mechanism for moving the two movable lenses of the relay optical system along an optical path in a manner that a space between the two movable lenses varies during changing magnification.

9. The microscope optical system of claim 8, wherein the relay optical system comprises a first lens group and a second lens group, and
- wherein the two movable lenses are included in the second lens group.

10. The microscope optical system of claim 8, wherein one of the two movable lenses includes a positive lens and a negative lens and the other of the two movable lens is a positive lens.

11. A microscope optical system comprising:
- an objective optical system for forming an intermediate image of an object; and
- a relay optical system for relaying the intermediate image,
- wherein the relay optical system comprises a first lens group and a second lens group,
- wherein the second lens group comprises a first subgroup and a second subgroup, and
- wherein when f2>f2B, the first subgroup comprises a quartz lens having positive refractive power and a fluorite lens having negative refractive power, and when f2>f2B, the first subgroup comprises a fluorite lens having positive refractive power and a quartz lens having negative refractive power, where f2 is the focal length of the second lens group, and f2B is the focal length of the second subgroup.

12. The microscope optical system of claim 10, further comprising a driving mechanism for inserting into and removing from an optical path the first subgroup.

13. The microscope optical system of claim 10, further comprising a driving mechanism for moving the first subgroup along an optical path.

14. A microscope optical system comprising:
- an objective optical system for forming an intermediate image of an object; and
- a relay optical system having a plurality of lenses for relaying the intermediate image,
- wherein the relay optical system comprises at least one quartz lens having positive refractive power, and
- wherein the relay optical system is a reducing optical system.

15. A microscope optical system comprising:
- an objective optical system for forming an intermediate image of an object; and
- a relay optical system having a plurality of lenses for relaying the intermediate image and forming an image of a pupil of the microscope optical system at a substantially infinite position,
- wherein the relay optical system comprises at least one quartz lens having positive refractive power.

16. A microscope optical system comprising:
- an objective optical system for forming an intermediate image of an object; and
- a relay optical system having a plurality of lenses for relaying the intermediate image,
- wherein the relay optical system comprises a first lens group and a second lens group, and wherein a quartz lens having positive refractive power is arranged in the second lens group,
- wherein the relay optical system is a magnifying optical system having a variable magnification power, and
- wherein the quartz lens having positive refractive power is fixed on the optical axis.

* * * * *